(No Model.)

H. H. JONES.
BICYCLE.

No. 314,849. Patented Mar. 31, 1885.

WITNESSES:
John Cook
C. Sedgwick

INVENTOR:
H. H. Jones
BY
ATTORNEYS.

UNITED STATES PATENT OFFICE.

HARRY H. JONES, OF LANCASTER, NEW HAMPSHIRE.

BICYCLE.

SPECIFICATION forming part of Letters Patent No. 314,849, dated March 31, 1885.

Application filed August 9, 1884. (No model.)

*To all whom it may concern:*

Be it known that I, HARRY H. JONES, of Lancaster, in the county of Coos and State of New Hampshire, have invented certain new and useful Improvements in Bicycles, of which the following is a full, clear, and exact description.

This invention relates to certain new and useful improvements in that class of bicycles in which the driving-wheel is not operated directly from the foot-levers, but by intermediate clutches and straps or bands—for instance, a "Star" bicycle.

The object of my invention is to facilitate changing the stroke.

The invention consists in the combination, with a foot-lever and a clutch, of a band connected with the foot-lever, and by means of a frame with a roller running on a bar secured to the foot-lever, the said bar having notches at the ends, and being provided with end arms, in which set-screws are held. The roller is pivoted in a frame having a tongue on which an adjustable slide is held.

Reference is to be had to the accompanying drawings, forming part of this specification, in which similar letters of reference indicate corresponding parts in both the figures.

Figure 1:
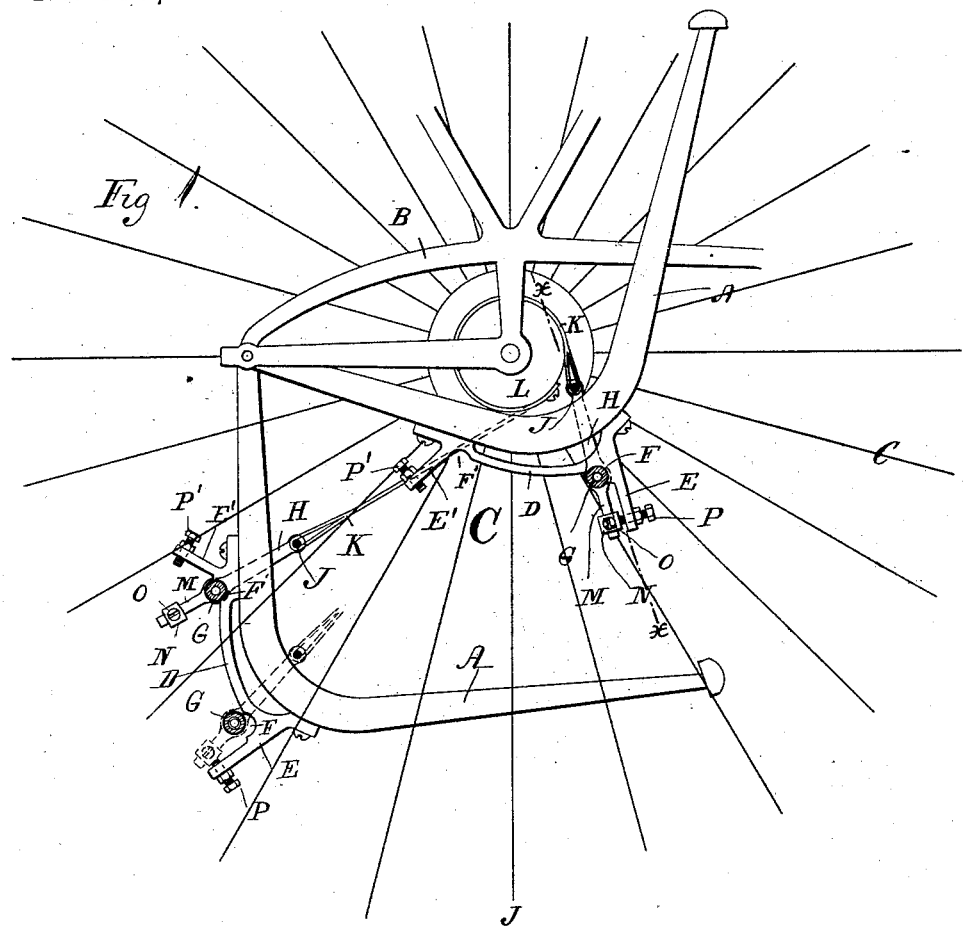
Figure 2:
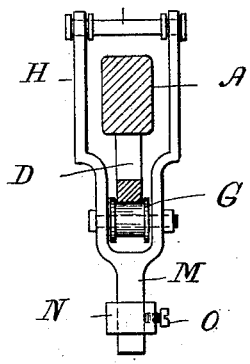
Figure 3:
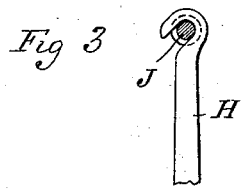

Figure 1 is a side view of the central portion of the driving-wheel, showing my improvements attached, the roller-frame being in section. Fig. 2 is an enlarged cross-sectional view on the line $x\ x$, Fig. 1.

The foot-levers A, either bent or straight, are pivoted to the frame B, in which the driving-wheel C is journaled.

On the bottom edge of each lever A a bar, D, is secured, which is provided with the prongs E and E' at the ends, and at the inner ends of the said prongs notches F F' are formed in the outer edges of the bar D, adapted to receive a roller, G, pivoted in a forked frame, H, embracing the lever A and the bar D, and having hooks at the opposite ends, in which a pin, J, is held, around which a strap, K, passes, which is also secured to the clutch in the clutch-box L on the axle or pivot of the wheel C. This construction is provided to facilitate removing or disconnecting the strap to clean the ratchet-boxes. Heads are provided on the ends of the pin J and collars a short distance from the ends, between which heads and collars the prongs are held, as shown in Fig. 2.

On the frame H a downwardly-projecting tongue, M, is formed, on which a sliding box, N, or other slide is held, which can be locked in the desired position by a set-screw, O.

In the ends of the arms E and E' set-screws P and P' are held, the points of the screws projecting toward each other.

The operation is as follows: When the roller G is in the notch F the bicycle is adjusted for speed, and when the roller is in the notch F' the bicycle is adjusted for power. If the roller G is in the notch F and is to be removed, the treadle-lever A is pressed downward into the lower position, thus causing the screw P in the arm E to act on the slide N on the tongue M, thus pushing the roller out of the notch F. The roller then slides along the bar D into the notch F', in which it remains, the bicycle being thus adjusted for power.

If the bicycle is to be adjusted for speed, the treadle-lever A is permitted to swing up against the clutch-box L, whereby the screw P' will strike the slide N and push the roller G out of the notch F', upon which the roller slides, into the notch F. The bicycle can thus be adjusted by pressing down the treadle-levers as far as possible or permitting them to swing up as far as possible. If the treadles are worked to make a full and complete stroke every time, the bicycle will alternately be adjusted for power or speed; but usually the treadles are not worked to their extreme limits, and either of the above-described adjustments is retained until the levers are depressed or raised as much as possible. If either adjustment is to be retained and is not to be changed while operating the bicycle, the slide N is so adjusted that the screws P or P' cannot strike it. If the levers A are then raised or lowered as much as possible, the set-screws cannot press the roller G out of either notches F or F', and the adjustment of the bicycle cannot be changed until the slide N is placed in its former position.

Having thus described my invention, I claim as new and desire to secure by Letters Patent—

1. In a bicycle, the combination, with a foot-lever and a clutch, of a strap or band connected with the clutch and with a roller, and of a bar secured on the foot-lever, on which bar the roller runs, substantially as herein shown and described.

2. In a bicycle, the combination, with a foot-lever and a clutch, of a strap or band connected with the clutch, a roller connected with the band, and a bar secured on the foot-lever, and provided at each end with an arm and a notch for receiving the roller, substantially as herein shown and described.

3. In a bicycle, the combination, with a foot-lever and a clutch, of a strap or band connected with the clutch, a frame held to the free end of the band and carrying a roller, and a bar secured on the foot-lever, and provided at each end with an arm and a notch for receiving the roller which runs on the said bar, substantially as herein shown and described.

4. In a bicycle, the combination, with a foot-lever, of a strap or band connected with the clutch, the frame H, having hooks at the ends, and the cross-pin J, held in the said hooks, around which pin the strap passes, and through which frame H the foot-lever A passes, substantially as herein shown and described.

5. In a bicycle, the combination, with a foot-lever and a clutch, of a strap or band connected with the clutch, the frame H, the roller G, the tongue M, the bar D, secured on the foot-lever and having arms E E' and notches F F', and the screws P P' in the arms E E', substantially as herein shown and described.

6. In a bicycle, the combination, with the foot-lever A and a clutch, of the band or strap K, connected with the clutch, the frame H, having the tongue M, the slide N, the screw O, the roller G, the bar D, having notches F F' and arms E E', and the set-screws P P' in the arms E E', substantially as herein shown and described.

HARRY H. JONES.

Witnesses:
DAVID H. WELLS,
HERMAN H. WELLS.